(12) United States Patent
Rustagi et al.

(10) Patent No.: US 8,385,521 B2
(45) Date of Patent: Feb. 26, 2013

(54) BILLING FOR CALL COMPLETE CALLS

(75) Inventors: Ram Prakash Rustagi, Bangalore (IN); Manivannan Arunachalam, Bangalore (IN); Ravi Auradkar, Norristown, PA (US)

(73) Assignee: Kirusa Inc., New Providence, NJ (US)

( * ) Notice: Subject to any disclaimer, the term of this patent is extended or adjusted under 35 U.S.C. 154(b) by 72 days.

(21) Appl. No.: 13/163,768

(22) Filed: Jun. 20, 2011

(65) Prior Publication Data

US 2011/0311034 A1  Dec. 22, 2011

(30) Foreign Application Priority Data

Jun. 21, 2010 (IN) .......................... 1718/CHE/2010

(51) Int. Cl.
*H04M 15/00* (2006.01)
(52) U.S. Cl. .............................. 379/114.03; 379/114.21
(58) Field of Classification Search ............. 379/114.03, 379/114.05, 114.21, 224.28, 121.05, 211.02; 455/406
See application file for complete search history.

(56) References Cited

U.S. PATENT DOCUMENTS

| | | | |
|---|---|---|---|
| 6,018,575 A * | 1/2000 | Gross et al. ............. 379/220.01 |
| 6,577,718 B1 * | 6/2003 | Kalmanek et al. ....... 379/114.22 |
| 6,625,268 B1 | 9/2003 | Wallenius |
| 6,741,849 B1 * | 5/2004 | Verkama et al. .............. 455/406 |
| 6,980,791 B2 | 12/2005 | Wallenius et al. |
| 2003/0119477 A1 | 6/2003 | Uppal et al. |
| 2003/0161460 A1 * | 8/2003 | Dammrose ................... 379/229 |
| 2006/0281443 A1 | 12/2006 | Chen et al. |

FOREIGN PATENT DOCUMENTS

WO   WO 2009006913 A1 *  1/2009

* cited by examiner

*Primary Examiner* — Quoc D Tran
(74) *Attorney, Agent, or Firm* — Ash Tankha; Lipton, Weinberger & Husick

(57) ABSTRACT

A method and system for billing a calling party for an unanswered call attempt is provided. A first network component receives a call attempt from the calling party and routes the call attempt to a second network component for establishing a communications link between the calling party and a called party. The second network component redirects the call attempt unanswered by the called party to the voice server. A billing management application, provided for managing the billing of the calling party, detects the redirection of the call attempt and indicates to the first network component to disable billing the calling party for the unanswered call attempt. The billing management application, in communication with the voice server, initiates billing of the calling party based on billing criteria, via the second network component instead of the first network component, for utilizing one or more services provided by the voice server.

27 Claims, 6 Drawing Sheets

BILLING FOR CALL COMPLETE CALLS

CROSS REFERENCE TO RELATED APPLICATIONS

This application claims the benefit of the following patent applications:
1. Provisional patent application number 1718/CHE/2010 titled "Billing For Call Complete Calls", filed on Jun. 21, 2010 in the Indian Patent Office.
2. Non-provisional patent application number 1718/CHE/2010 titled "Billing For Call Complete Calls", filed on Jun. 20, 2011 in the Indian Patent Office.

The specifications of the above referenced patent applications are incorporated herein by reference in their entirety.

BACKGROUND

In telecommunication networks, a call made by a calling party to a called party is routed through a source switch of the calling party to a destination switch of the called party. If the called party is unavailable, for example, due to the called party's communication device being switched off, an occurrence of a busy signal, or an out of network signal, the call is sometimes redirected to a server that provides, for example, voice services such as an automatic voice short message service (AVSMS), voicemail, etc., or non-voice services at the called party side. This redirection results in the call being answered at the destination switch, but not by the called party.

Conventionally billing of the calling party is under the control of the source switch. It is the source switch that decides whether to charge for the call and if so, the amount to be charged. In the case of toll free calls, the source switch knows that it is a toll free call and thus does not charge the calling party. In the case of a toll free call, the call charge is billed to the called party, and the destination switch generates the call charges events and charges the called party accordingly.

Conventionally, a charging server associated with the calling party bills the calling party for utilizing voice services and non-voice services provided by the server based on a subscription plan of the calling party. The server that provides the voice services or the non-voice services and to which the call is redirected by the destination switch has no control over billing the calling party via the destination switch for the services utilized by the calling party. There is a need for providing control of billing of the calling party to the server based on services provided to the calling party by the server.

Hence, there is a long felt but unresolved need for a method and system that detects the redirection of an unanswered call attempt made to the called party by the calling party to a server at the called party side, disables billing of the calling party via the source switch, and initiates billing of the calling party via the destination switch based on services provided to the calling party by the server.

SUMMARY OF THE INVENTION

This summary is provided to introduce a selection of concepts in a simplified form that are further described in the detailed description of the invention. This summary is not intended to identify key or essential inventive concepts of the claimed subject matter, nor is it intended for determining the scope of the claimed subject matter.

The method and system disclosed herein addresses the above stated needs for detecting redirection of an unanswered call attempt made to a called party by a calling party to a voice server at the called party side, disabling billing of the calling party via a first network component, that is, a source switch, and initiating billing of the calling party via a second network component, that is, a destination switch based on services provided to the calling party by the voice server. As used herein, the term "unanswered call attempt" refers to a call attempt made by a calling party to a called party, that is not received or answered by the called party due to an occurrence of, for example, a busy signal, an out of coverage signal, an unreachable signal, a switched off signal, network congestion, an unanswered signal from the called party, etc. Also, as used herein, the term "calling party" refers to a user who originates a call or attempts to place a call to a called party. The term "called party" refers to a user who is a recipient or an intended recipient of a call made by the calling party. The method and system disclosed herein enables billing of the calling party via the destination switch instead of the source switch, for the unanswered call attempt made to the called party.

The method and system disclosed herein provides a billing management application in communication with a voice server for managing billing of a calling party. In an embodiment, the billing management application is implemented within the voice server. In another embodiment, the billing management application is implemented on an independent application server. The first network component receives a call attempt from the calling party to contact the called party. The first network component routes the received call attempt to the second network component for establishing a communications link between the calling party and the called party. As used herein, the terms "first network component" and "second network component" refer to, for example, a mobile switching center (MSC), a base station subsystem (BSS), a radio access network (RAN), a telephone exchange, a telephone switch, etc., serving the calling party and the called party respectively.

The second network component redirects the call attempt unanswered by the called party to the voice server. The voice server provides one or more services, for example, automatic voice short message services (AVSMS), voicemail services, emergency services, non-voice services, etc. The second network component redirects the call attempt to the voice server due to an occurrence of, for example, a busy signal, an out of coverage signal, an unreachable signal, a switched off signal, network congestion, or an unanswered signal from the called party. The billing management application detects the redirection of the call attempt unanswered by the called party to the voice server.

The billing management application then indicates to the first network component to disable billing of the calling party for the unanswered call attempt. In an embodiment, the billing management application communicates with and indicates to the first network component to disable billing of the calling party by transmitting one or more message parameters to the first network component, for example, prior to, during, and/or after receipt of a call answer message from the voice server. In another embodiment, the billing management application communicates with and indicates to the first network component to disable billing of the calling party by transmitting one or more message parameters to the first network component, in the call answer message of the call attempt.

In another embodiment, the billing management application communicates with and indicates to the first network component to disable billing of the calling party by direct communication between the billing management application and the first network component via a proprietary communications protocol. For example, the billing management application directly communicates with the first network component by invoking one or more proprietary application programming interface (API) calls provided by the first network component. In another embodiment, the billing management application communicates with and indicates to the first network component to disable billing of the calling party by informing a charging server associated with the calling party to disregard billing requests made by the first network component for billing of the calling party. In another embodiment, the billing management application indicates to the first network component to disable billing of the calling party by an absence of a billing communication between the billing management application and the first network component. The first network component disables the billing of the calling party due to the absence of the billing communication.

The billing management application, in communication with the voice server, initiates billing of the calling party based on billing criteria, via the second network component for utilizing one or more services provided by the voice server. The billing criteria comprise, for example, one or more of event based criteria, time duration based criteria, a charging limit defined by the charging server, state of the call attempt, number of services utilized by the calling party, type of services utilized by the calling party, etc., or any combination thereof. In an embodiment, the billing management application determines the billing charge for the calling party based on one or more of the billing criteria. In another embodiment, the billing management application detects utilization of one or more services by the calling party and informs the charging server to bill the calling party as directed by the billing management application. Therefore, the calling party is billed via the second network component instead of the first network component for utilization of one or more services provided by the voice server. The billing management application can determine the billing charge in communication with the voice server, via the second network component and instruct the charging server associated with the calling party to bill the calling party that billing charge. If the initiation of billing of the calling party by the billing management application fails, the billing management application can instruct the voice server not to offer the services requested by the calling party.

In an embodiment, the billing management application detects redirection of repeated call attempts made by the calling party to contact the called party within a short period of time to the voice server as emergency call attempts. The billing management application, in communication with the voice server, initiates the billing of the calling party via the second network component for utilizing one or more emergency services provided by the voice server for the emergency call attempts unanswered by the called party.

In another embodiment, the voice server provides one or more services to the calling party based on one or more of the billing criteria, for example, a charging limit defined by the charging server. The billing management application, in communication with the voice server, initiates the billing of the calling party based on one or more of the billing criteria via the second network component for utilizing the provided services. In an embodiment, the billing management application, the calling party, or the first network component can terminate the utilization of the services provided by the voice server.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein.

DETAILED DESCRIPTION OF THE INVENTION

Figure 1:
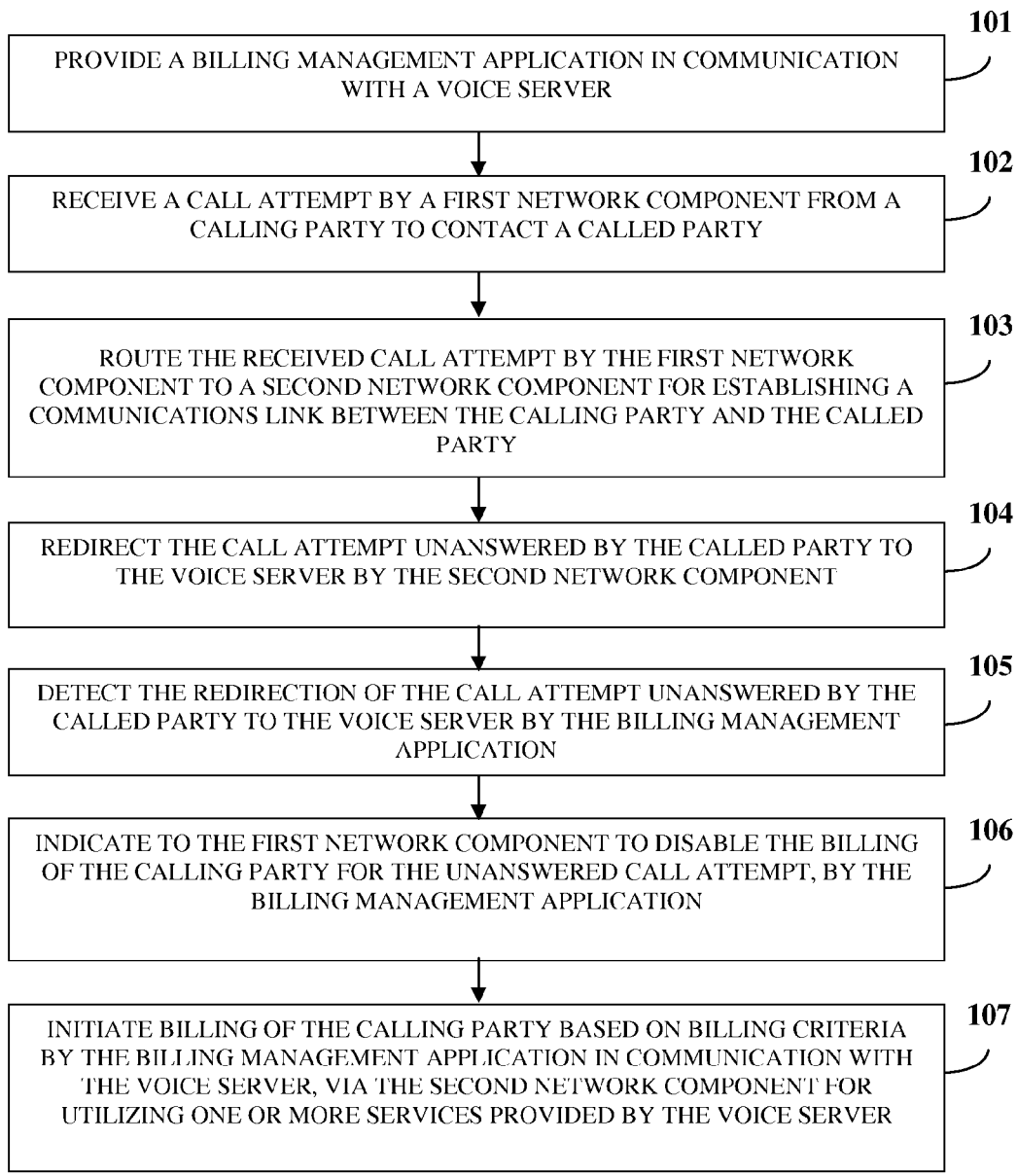
FIG. 1 illustrates a method for billing a calling party for an unanswered call attempt made to a called party.

FIG. 1 illustrates a method for billing a calling party for an unanswered call attempt made to a called party. As used herein, the term "unanswered call attempt" refers to a call attempt made by a calling party to a called party, that is not received or answered by the called party due to an occurrence of, for example, a busy signal, an out of coverage signal, an unreachable signal, a switched off signal, network congestion, an unanswered signal from the called party, etc. The term "call attempt" refers to an effort made by a calling party to contact and communicate with a called party in a telecommunication network. Also, as used herein, the term "calling party" refers to a user who originates a call or attempts to place a call to a called party. The term "called party" refers to a user who is a recipient or an intended recipient of a call made by the calling party. The called party is therefore the user with whom the calling party wants to communicate a voice call.

The method disclosed herein provides 101 a billing management application in communication with a voice server. The billing management application is a software application implemented on an independent application server or within a voice server for managing billing of the calling party. A first network component receives 102 a call attempt from the calling party to contact a called party. The first network component routes 103 the received call attempt to a second network component for establishing a communications link between the calling party and the called party. As used herein, the terms "first network component" and "second network component" refer to, for example, a mobile switching center (MSC), a base station subsystem (BSS), a radio access network (RAN), a telephone exchange, a telephone switch, etc., serving the calling party and the called party respectively. The first network component is, for example, an originating switch or a source switch associated with the calling party. The second network component is, for example, a terminating switch or a destination switch associated with the called party. Also, as used herein, the term "communications link" refers to a transmission medium for exchanging telecommunication signals. The first network component directs the call attempt received from the calling party to the called party, for example, based on the called party's number dialed on a communication device of the calling party. The communication device is, for example, a mobile phone, a laptop, a personal digital assistant (PDA), a tablet computing device, etc.

The second network component redirects 104 the call attempt unanswered by the called party to the voice server. The voice server provides one or more services, for example, voice services such as automatic voice short message services (AVSMS), voicemail services, etc., non-voice services, emergency services, etc. The second network component redirects the call attempt to the voice server due to an occurrence of, for example, a busy signal, an out of coverage signal, an unreachable signal, a switched off signal, network congestion, or an unanswered signal from the called party. The billing management application detects 105 the redirection of the call attempt unanswered by the called party to the voice server. Moreover, the billing management application comprises logic for determining the billing charge and processing the billing of the calling party, for example, based on the voice services utilized at the voice server by the calling party, the state of the call attempt, etc. The billing management application, in communication with the voice server, determines the billing charge for billing the calling party and instructs a charging server associated with the calling party to bill the calling party the determined billing charge.

The billing management application indicates 106 to the first network component to disable billing of the calling party for the unanswered call attempt. In an embodiment, the billing management application communicates with and indicates to the first network component to disable billing of the calling party by transmitting, for example, one or more message parameters to the first network component prior to, during, and/or after receipt of a call answer message from the voice server. As used herein, the term "call answer message" refers to a message sent by the voice server to initiate provision of one or more services, for example, voice services, to the calling party on detection of an unanswered call attempt. In an example, the message parameters are transmitted as part of the integrated services digital network (ISDN) user part (ISUP) standard call handling message. The ISUP is an International Telecommunication Union (ITU) standard for exchanging messages for call control. In another embodiment, the billing management application communicates with and indicates to the first network component to disable billing of the calling party by transmitting one or more message parameters to the first network component, in the call answer message of the call attempt. The message parameters inform the charging server associated with the calling party not to bill the calling party for utilizing one or more services provided by the voice server. The charging server is a server that performs and tracks the billing of the calling party. In an example, the billing management application sends one or more message parameters during integrated services digital network (ISDN) user part (ISUP) signaling, where an ISUP answer message comprises a billing indicator "no charge".

In another embodiment, the billing management application communicates with and indicates to the first network component to disable billing of the calling party by direct communication between the billing management application and the first network component via a proprietary communications protocol. In this embodiment, the charging server associated with the calling party provides proprietary application programming interface (API) calls for handling the billing of the calling party. The billing management application invokes the API calls and thereby instructs the charging server when and how to bill the calling party. The API calls can be proprietary, and hence the details of the API calls vary from one implementation to another.

In another embodiment, the billing management application communicates with and indicates to the first network component to disable billing of the calling party by informing the charging server to disregard billing requests made by the first network component for billing of the calling party. In this embodiment, the billing management application communicates with the charging server, for example, using the Customized Applications for Mobile networks Enhanced Logic (CAMEL) standard, the Intelligent Network Application Part (INAP) protocol, etc.

In another embodiment, the billing management application indicates to the first network component to disable billing of the calling party by an absence of a billing communication between the billing management application and the first network component. That is, if the first network component is not configured to handle the message parameters that indicate to the first network component to disable the billing of the calling party, the billing management application disables transmission of an event such as an answer message to the first network component to prevent the first network component from billing the calling party. The first network component disables the billing of the calling party due to the absence of the billing communication. In this embodiment, the charging server responsible for billing the calling party does not receive charging events, for example, an answer signal or message and therefore does not bill the calling party. In an example, the billing management application does not transmit one or more message parameters that comprise an indication to bill the calling party prior to, during, and/or after receipt of the call answer message from the voice server to prevent the first network component from billing the calling party.

The billing management application, in communication with the voice server, initiates 107 billing of the calling party based on billing criteria, via the second network component, for utilizing one or more services provided by the voice server. The billing criteria comprise, for example, one or more of event based criteria, time duration based criteria, a charging limit defined by the charging server, state of the call attempt, number of services utilized by the calling party, type of services utilized by the calling party, etc., or any combination thereof. The event based criteria comprise, for example, billing the calling party at the start of utilization of a service such as a voice service by the calling party. The event based criteria is independent of the duration of the utilization of the service provided by the voice server. The time duration based criteria comprise, for example, billing the calling party in proportion to the duration of utilization of the service provided by the voice server. That is, the longer the utilization of the service, the higher is the billing charge. The billing management application instructs the charging server to bill the calling party based on the billing criteria. The billing management application also disables billing of the calling party by the charging server based on the subscription plan of the calling party. In an embodiment, the billing management application detects utilization of one or more services by the calling party and informs the charging server to bill the calling party as directed by the billing management application. The calling party is therefore billed via the second network component instead of the first network component for utilizing one or more services provided by the voice server.

In an embodiment, the billing management application detects redirection of repeated call attempts made by the calling party to contact the called party within a short period of time to the voice server as emergency call attempts. The billing management application, in communication with the voice server, initiates the billing of the calling party via the second network component for utilizing one or more emergency services provided by the voice server for the emergency call attempts unanswered by the called party.

In another embodiment, the voice server provides one or more services to the calling party based on one or more of the billing criteria, for example, a charging limit defined by the charging server. The billing management application, in communication with the voice server, initiates the billing of the calling party based on one or more of the billing criteria via the second network component for utilizing the provided services. In an embodiment, the billing management application, the calling party, or the first network component can terminate the utilization of the services provided by the voice server.

Consider an example where the calling party attempts to call the called party. If the called party is unavailable, for example, due to the called party's communication device being switched off, an occurrence of a busy signal, or an out of network signal, the call attempt by the calling party is redirected to the voice server that provides voice services, for example, automatic voice short message services (AVSMS), voicemail services, etc. The method disclosed herein enables billing of the calling party by the billing management application via the second network component based on the voice services utilized by the calling party at the voice server and disables the billing of the calling party via the first network component based on the subscription plan of the calling party. In this manner, the method disclosed herein enables the billing management application to determine the billing charge of the calling party and to instruct the charging server to bill the calling party, for example, based on the voice services, one or more events, a duration for the voice services, actions of the calling party, etc., or any combination thereof. If the billing management application or the voice server associated with the second network component fails to initiate billing of the calling party for the voice services, the billing management application instructs the voice server to disable the voice services provided to the calling party.

Consider another example where the calling party attempts to call the called party. If the called party does not answer the call, the calling party is redirected to the voice server associated with the called party due to the unavailability of the called party. In this example, the voice server associated with the second network component prompts the calling party to leave a voice recording for the called party. The billing management application communicates with the charging server to disable the billing of the calling party based on the subscription plan of the calling party. In this example, the billing management application further communicates with the charging server to bill the calling party based on the calling party leaving a voice recording for the called party as specified by the voice server via the second network component. The call attempt may be terminated by the calling party or the first network component.

In an example, when a calling party A calls a called party B, and if called party B does not answer the call, then the second network component redirects this call to the voice server. The voice server then decides if the calling party A is to be given the option of leaving, for example, a voice SMS in the voice server for the called party B. If the voice server provides this option, the method disclosed herein enables the billing management application, in communication with the voice server, to initiate billing of the calling party A based on the charge as determined by the voice server or the billing management application rather than the voice call charge as per the subscription plan of the calling party A.

Figure 2:
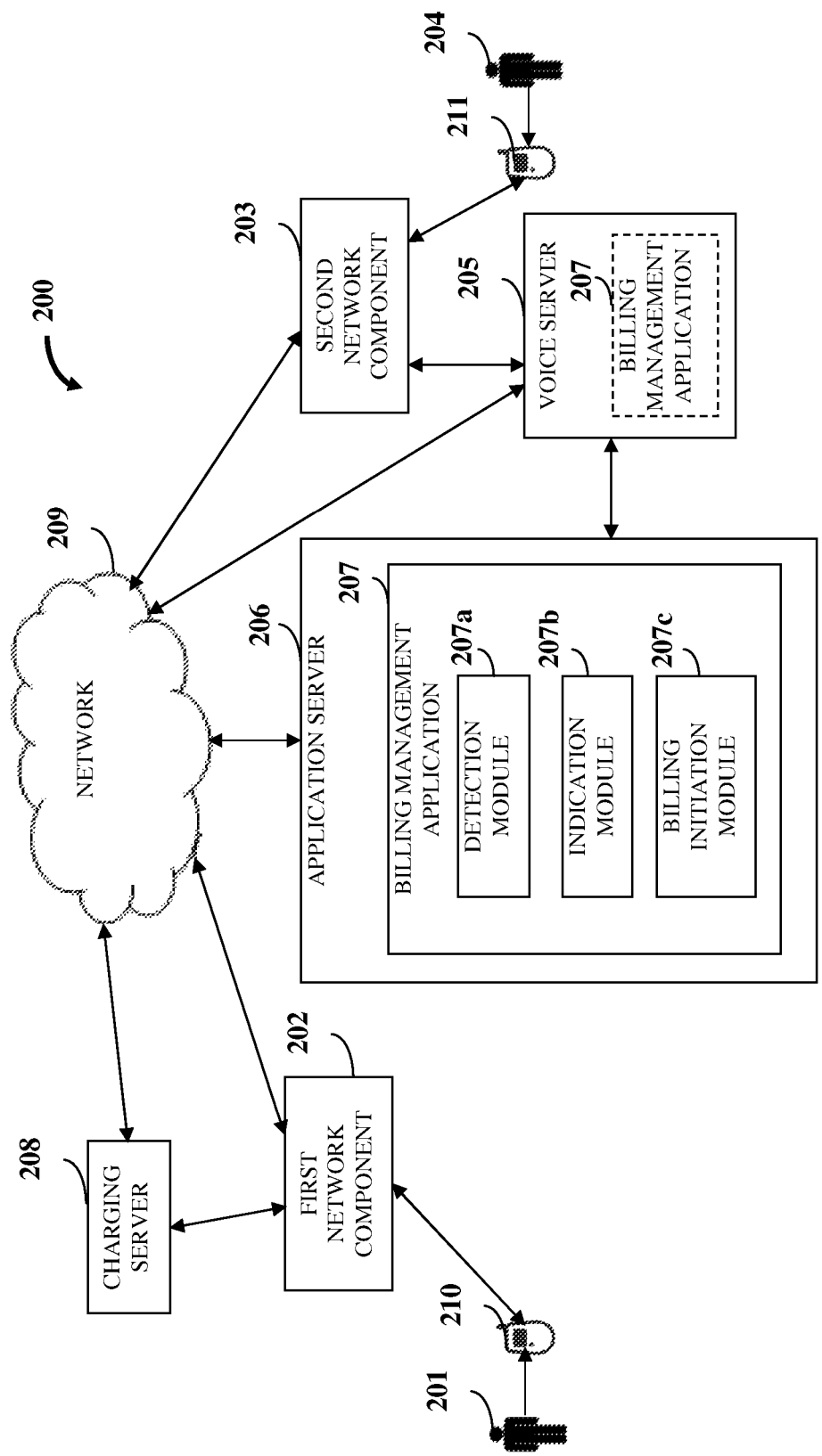
FIG. 2 exemplarily illustrates a system for billing a calling party for an unanswered call attempt made to a called party.

FIG. 2 exemplarily illustrates a system 200 for billing a calling party 201 for an unanswered call attempt made to a called party 204. The system 200 disclosed herein comprises a first network component 202, a second network component 203, a voice server 205, a billing management application 207, and a charging server 208 communicating via a network 209. The network 209 is a telephone network and/or a data network that connects exchanges, switches, etc. The network 209 is, for example, a wired telephony network, a wireless network, a voice call network, a signaling system number 7 (SS7) network, an internet protocol data network, other data networks, etc.

When the calling party 201 attempts to make a call using a communication device 210 to contact the called party 204, the communication device 210 of the calling party 201 connects to the network 209 via the first network component 202. The communication device 210 of the calling party 201 connects to the first network component 202. The communication device 211 of the called party 204 connects to the second network component 203. The first network component 202 serves the calling party 201 and receives the call attempt from the calling party 201. The first network component 202 routes a call made by the calling party 201 to an appropriate destination based on a dialed number via the network 209. The first network component 202 routes the received call attempt to the second network component 203 via the network 209 for establishing a communications link between the calling party 201 and the called party 204. The second network component 203 serves the called party 204 and is configured to redirect incomplete or unanswered calls of the called party 204.

The second network component 203 receives the call attempt from the first network component 202 via the network 209 and in turn routes the received call attempt to the called party's 204 communication device 211. The second network component 203 redirects unanswered calls, that is, calls not answered by the called party 204 to the voice server 205. The voice server 205 is the point of interaction of calls made to the called party 204 and redirected by the second network component 203. The second network component 203 redirects the call attempt unanswered by the called party 204 to the voice server 205 due to an occurrence of, for example, a busy signal, an out of coverage signal, an unreachable signal, a switched off signal, network congestion, or an unanswered signal from the called party 204.

The billing management application 207, in communication with the voice server 205, manages billing of the calling party 201. In an embodiment, the billing management application 207 is implemented on an independent application server 206. The application server 206 is an application logic processing server that communicates with the voice server 205 to initiate billing of the calling party 201. In this embodiment, the voice server 205 and the application server 206 can be implemented as a single server or multiple servers capable of performing the functions rendered by both the voice server 205 and the application server 206. In another embodiment, the billing management application 207 can be implemented on a single application server 206 or multiple applications servers for managing billing of the calling party 201. In another embodiment, the billing management application 207 is implemented within the voice server 205. In this embodiment, the billing management application 207 can be implemented on a single server or multiple servers capable of performing the functions rendered by both the billing management application 207 and the voice server 205.

The billing management application 207 comprises a detection module 207a, an indication module 207b, and a billing initiation module 207c. The detection module 207a detects redirection of the call attempt unanswered by the called party 204 from the second network component 203 to the voice server 205. The indication module 207b indicates to the first network component 202 to disable billing of the calling party 201 for the unanswered call attempt as disclosed in the detailed description of FIG. 1. In an embodiment, the indication module 207b communicates with and indicates to the first network component 202 to disable billing of the calling party 201 by transmitting one or more message parameters to the first network component 202, for example, prior to, during, and/or after receipt of a call answer message from the voice server 205. In another embodiment, the indication module 207b communicates with and indicates to the first network component 202 to disable billing of the calling party 201 by transmitting one or more message parameters to the first network component 202, in the call answer message of the call attempt.

In another embodiment, the indication module 207b communicates with and indicates to the first network component 202 to disable billing of the calling party 201 by direct communication between the billing management application 207 and the first network component 202 via a proprietary communications protocol. In another embodiment, the indication module 207b communicates with and indicates to the first network component 202 to disable billing of the calling party 201 by informing the charging server 208 associated with the calling party 201 to disregard billing requests made by the first network component 202 for billing the calling party 201. In another embodiment, the indication module 207b indicates to the first network component 202 to disable billing of the calling party 201 by an absence of a billing communication between the billing management application 207 and the first network component 202. The first network component 202 disables billing of the calling party 201 due to the absence of the billing communication.

The billing initiation module 207c, in communication with the voice server 205, initiates billing of the calling party 201 based on one or more of billing criteria, for example, event based criteria, time duration based criteria, a charging limit defined by the charging server 208, state of the call attempt, number of services utilized by the calling party 201, type of services utilized by the calling party 201, etc., via the second network component 203 for utilizing one or more services provided by the voice server 205. The billing initiation module 207c of the billing management application 207 instructs the charging server 208 to bill the calling party 201 for utilizing one or more services provided by the voice server 205. Therefore, the calling party 201 is billed via the second network component 203 instead of the first network component 202 for utilization of one or more services provided by the voice server 205. The charging server 208 bills the calling party 201 as directed by the billing initiation module 207c of the billing management application 207.

In an embodiment, the billing initiation module 207c determines the billing charge and processes the billing of the calling party 201, for example, based on the services utilized at the voice server 205 by the calling party 201, the state of the call attempt, etc. In an embodiment, the detection module 207a detects utilization of one or more services by the calling party 201 and informs the charging server 208 to bill the calling party 201 as directed by the billing initiation module 207c. In an embodiment, the billing initiation module 207c terminates the utilization of one or more services provided by the voice server 205.

In an embodiment, the detection module 207a detects redirection of repeated call attempts made by the calling party 201 to contact the called party 204 within a short period of time to the voice server 205 as emergency call attempts. The billing initiation module 207c, in communication with the voice server 205, initiates the billing of the calling party 201 via the second network component 203 for utilizing one or more emergency services provided by the voice server 205 for the emergency call attempts unanswered by the called party 204.

In an embodiment, the voice server 205 provides one or more services to the calling party 201 based on one or more of the billing criteria, for example, a charging limit defined by the charging server 208. The billing initiation module 207c, in communication with the voice server 205, initiates the billing of the calling party 201 based on one or more of the billing criteria via the second network component 203 for utilizing the provided services. The voice server 205, in addition, to completing the calls by offering related voice services for call completion to the calling party 201, also offers other services. For example, if the same calling party 201 makes multiple call attempts to the called party 204 within a short span of time, the voice server 205 treats this is an emergency and offers emergency services or redirects the unanswered call to emergency servers.

Moreover, the voice server 205 instead of initiating charging of a single charge to the calling party 201 for the voice services offered, checks the charging limit of the calling party 201 from the charging server 208, and based upon the charging limit defined by the charging server 208, offers the services with corresponding quality of services to the calling party 201 depending upon the charging limit. In an example, the voice server 205 interacts with the calling party 201 and determines what kind of voice service the calling party 201 desires, offers the desired voice service to the calling party 201, and communicates with the billing management application 207 to initiate billing of the calling party 201 accordingly.

Figure 3:
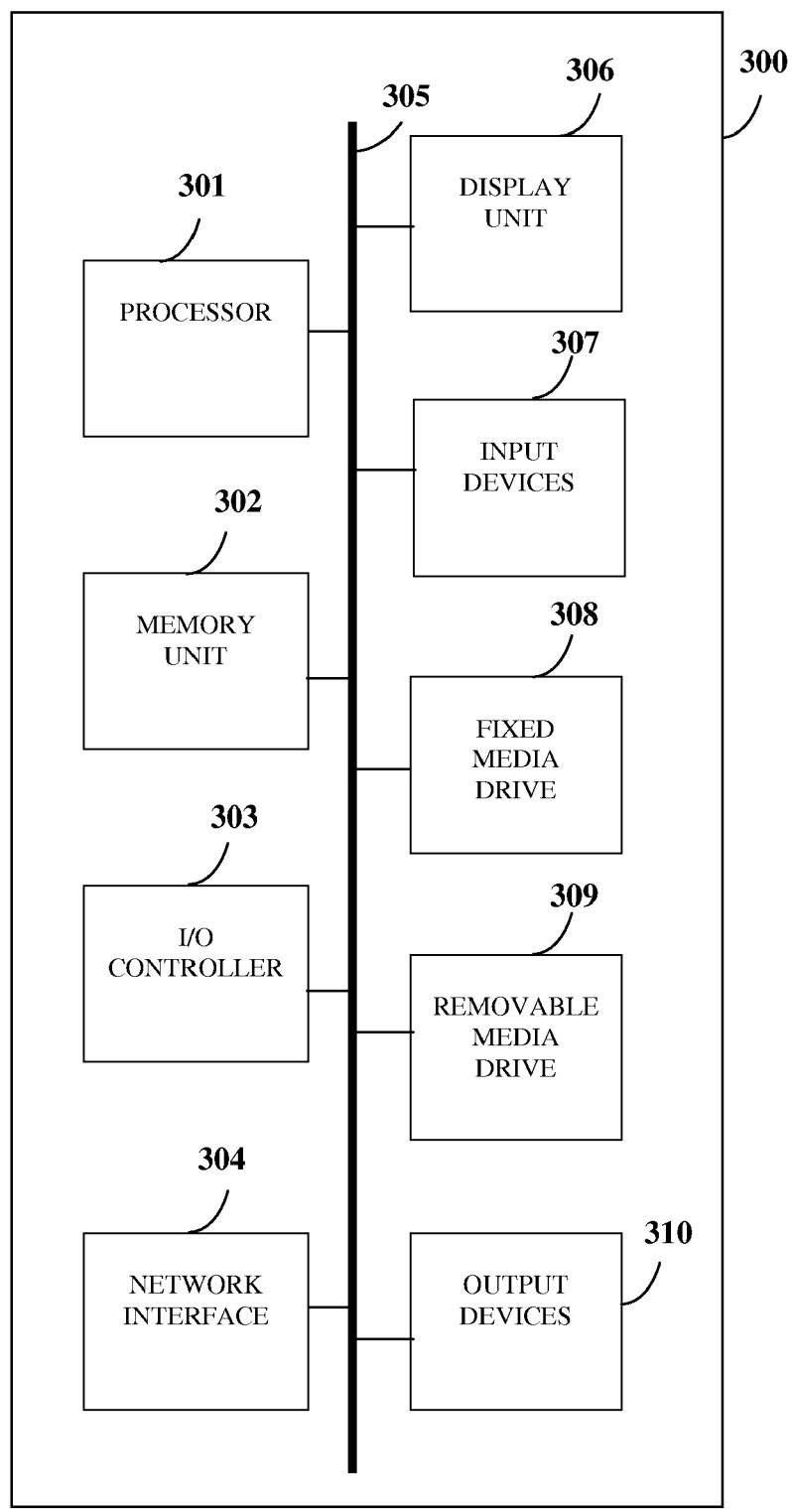
FIG. 3 exemplarily illustrates the architecture of a computer system employed by a billing management application for managing billing of a calling party for an unanswered call attempt made to a called party.

FIG. 3 exemplarily illustrates the architecture of a computer system 300 employed by the billing management application 207 for managing billing of a calling party 201 for an unanswered call attempt made to a called party 204. The computer system 300 comprises, for example, a processor 301, a memory unit 302 for storing programs and data, an input/output (I/O) controller 303, a network interface 304, a data bus 305, a display unit 306, input devices 307, a fixed media drive 308, a removable media drive 309 for receiving removable media, output devices 310, etc.

The processor 301 is an electronic circuit that executes computer programs. The memory unit 302 stores programs, applications, and data. For example, the modules 207a, 207b, and 207c of the billing management application 207 are stored on the memory unit 302 of the computer system 300. The memory unit 302 is, for example, a random access memory (RAM) or another type of dynamic storage device that stores information and instructions for execution by the processor 301. The memory unit 302 also stores temporary variables and other intermediate information used during execution of the instructions by the processor 301. The computer system 300 further comprises a read only memory (ROM) or another type of static storage device that stores static information and instructions for the processor 301. The network interface 304 enables connection of the computer system 300 to the network 209. The network 209 is, for example, a local area network (LAN), a wide area network, a mobile communication network, a signaling system number 7 (SS7) network, a wired telephony network, any generic data network, etc. The computer system 300 that executes the billing management application 207 communicates with other computer systems, for example, the voice server 205 through the network interface 304. The network interface 304 comprises, for example, an infrared (IR) interface, a WiFi interface, a universal serial bus interface (USB), a local area network (LAN), a wide area network (WAN) interface, a Worldwide Interoperability for Microwave Access (WiMAX) interface, etc. The billing management application 207 communicates with the second network component 203 via the network interface 304.

The I/O controller 303 controls the input and output actions performed, for example, by operators of the billing management application 207. The data bus 305 permits communication between the modules, for example, 207a, 207b, and 207c of the billing management application 207. The display unit 306 displays the results computed by the billing management application 207, for example, to the operators of the billing management application 207. The input devices 307 are used for inputting data into the computer system 300. The input devices 307 are, for example, a keyboard such as an alphanumeric keyboard, a joystick, a mouse, a touch pad, a light pen, etc. The output devices 310 output the results of the actions computed by the billing management application 207, for example, the determined billing charge, to the operators of the billing management application 207.

Computer applications and programs are used for operating the computer system 300. The programs are loaded onto the fixed media drive 308 and into the memory unit 302 of the computer system 300 via the removable media drive 309. In an embodiment, the computer applications and programs may be loaded directly through the network 209. Computer applications and programs are executed by double clicking a related icon displayed on the display unit 306 using one of the input devices 307.

The computer system 300 employs an operating system for performing multiple tasks. The operating system is responsible for management and coordination of activities and sharing of resources of the computer system 300. The operating system further manages security of the computer system 300, peripheral devices connected to the computer system 300, and network connections. The operating system recognizes keyboard inputs and pointing device inputs of an operator, output display, files, and directories stored locally on the fixed media drive 308. The operating system on the computer system 300 executes different programs, for example, a web browser, an electronic mail (email) application, a customized program, etc., initiated by the operators of the billing management application 207 using the processor 301. The operating system monitors the use of the processor 301. The processor 301 retrieves the instructions for executing the modules, for example, 207a, 207b, and 207c of the billing management application 207 from the program memory in the form of signals. A program counter determines the location of the instructions in the program memory. The program counter stores a number that identifies the current position in the program of the modules, for example, 207a, 207b, and 207c of the billing management application 207.

The instructions fetched by the processor 301 from the program memory after being processed are decoded. The instructions are placed in an instruction register (IR) in the processor 301. After processing and decoding, the processor 301 executes the instructions. For example, the detection module 207a defines instructions for detecting redirection of the call attempt unanswered by the called party 204 to the voice server 205. The indication module 207b defines instructions for indicating to the first network component 202 to disable billing of the calling party 201 for the unanswered call attempt as disclosed in the detailed description of FIG. 2. The billing initiation module 207c defines instructions for initiating billing of the calling party 201 based on one or more of the billing criteria, in communication with the voice server 205, via the second network component 203, for utilizing one or more services provided by the voice server 205. In an embodiment, the billing initiation module 207c defines instructions for determining the billing charge for the calling party 201 based on one or more of the billing criteria and for instructing the charging server 208 to bill the calling party 201 the determined billing charge.

The detection module 207a defines instructions for detecting utilization of one or more services by the calling party 201 and for informing the charging server 208 to bill the calling party 201 as directed by the billing initiation module 207c. In an embodiment, the billing initiation module 207c defines instructions for terminating the utilization of one or more services provided by the voice server 205.

In another embodiment, the detection module 207a defines instructions for detecting redirection of repeated call attempts made by the calling party 201 to contact the called party 204 within a short period of time to the voice server 205 as emergency call attempts. The billing initiation module 207c defines instructions for initiating the billing of the calling party 201, in communication with the voice server 205, via the second network component 203 for utilizing one or more emergency services provided by the voice server 205 for the emergency call attempts unanswered by the called party 204. The processor 301 of the computer system 300 retrieves the instructions defined by the detection module 207a, the indication module 207b, and the billing initiation module 207c and executes the instructions.

At the time of execution, the instructions stored in the instruction register are examined to determine the operations to be performed. The operations include arithmetic and logic operations. The processor 301 then performs the specified operations. The operating system performs multiple routines for performing a number of tasks required to assign the input devices 307, the output devices 310, and memory for execution of the modules, for example, 207a, 207b, and 207c of the billing management application 207. The tasks performed by the operating system comprise assigning memory to the modules, for example, 207a, 207b, and 207c of the billing management application 207, moving data between the memory unit 302 and disk units, and handling input/output operations. The operating system performs the tasks on request by the operations and after performing the tasks, the operating system transfers the execution control back to the processor 301. The processor 301 continues the execution to obtain one or more outputs. The outputs of the execution of the modules, for example, 207a, 207b, and 207c of the billing management application 207 are displayed, for example, to the operators of the billing management application 207.

Disclosed herein is also a computer program product comprising computer executable instructions embodied in a non-transitory computer readable storage medium. As used herein, the term "non-transitory computer readable storage medium" refers to all computer readable media, for example, non-volatile media such as optical disks or magnetic disks, volatile media such as a register memory, processor cache, etc., and transmission media such as wires that constitute a system bus coupled to the processor 301, except for a transitory, propagating signal.

The computer program product disclosed herein comprises one or more computer program codes for managing billing of a calling party 201 for an unanswered call attempt made to a called party 204. For example, the computer program product disclosed herein comprises a first computer program code for detecting redirection of the call attempt made by the calling party 201 and unanswered by the called party 204 to the voice server 205, a second computer program code for indicating to the first network component 202 to disable billing of the calling party 201 for the unanswered call attempt, and a third computer program code for initiating billing of the calling party 201 based on one or more of the billing criteria, in communication with the voice server 205, via the second network component 203, for utilizing one or more services provided by the voice server 205, whereby the calling party 201 is billed via the second network component 203 instead of the first network component 202 for the utilization of one or more services provided by the voice server 205. The computer program product disclosed herein further comprises additional computer program codes for performing additional steps that may be required and contemplated for managing billing of the calling party 201 for an unanswered call attempt made to the called party 204.

The computer program codes comprising the computer executable instructions for managing billing of the calling party 201 for an unanswered call attempt made to the called party 204 are embodied on the non-transitory computer readable storage medium. The processor 301 of the computer system 300 retrieves these computer executable instructions and executes them. When the computer executable instructions are executed by the processor 301, the computer executable instructions cause the processor 301 to perform the method steps for managing billing of the calling party 201 for an unanswered call attempt made to the called party 204. In an embodiment, a single piece of computer program code comprising computer executable instructions performs one or more steps of the method disclosed herein for managing billing of the calling party 201 for an unanswered call attempt made to the called party 204.

For purposes of illustration, the detailed description refers to the billing management application 207 being run locally on a computer system 300; however the scope of the method and system 200 disclosed herein is not limited to the billing management application 207 being run locally on the computer system 300 via the operating system and the processor 301, but may be extended to run remotely over the network 209 by employing a web browser and a remote server, a mobile device, or other electronic devices.

Figure 4A:
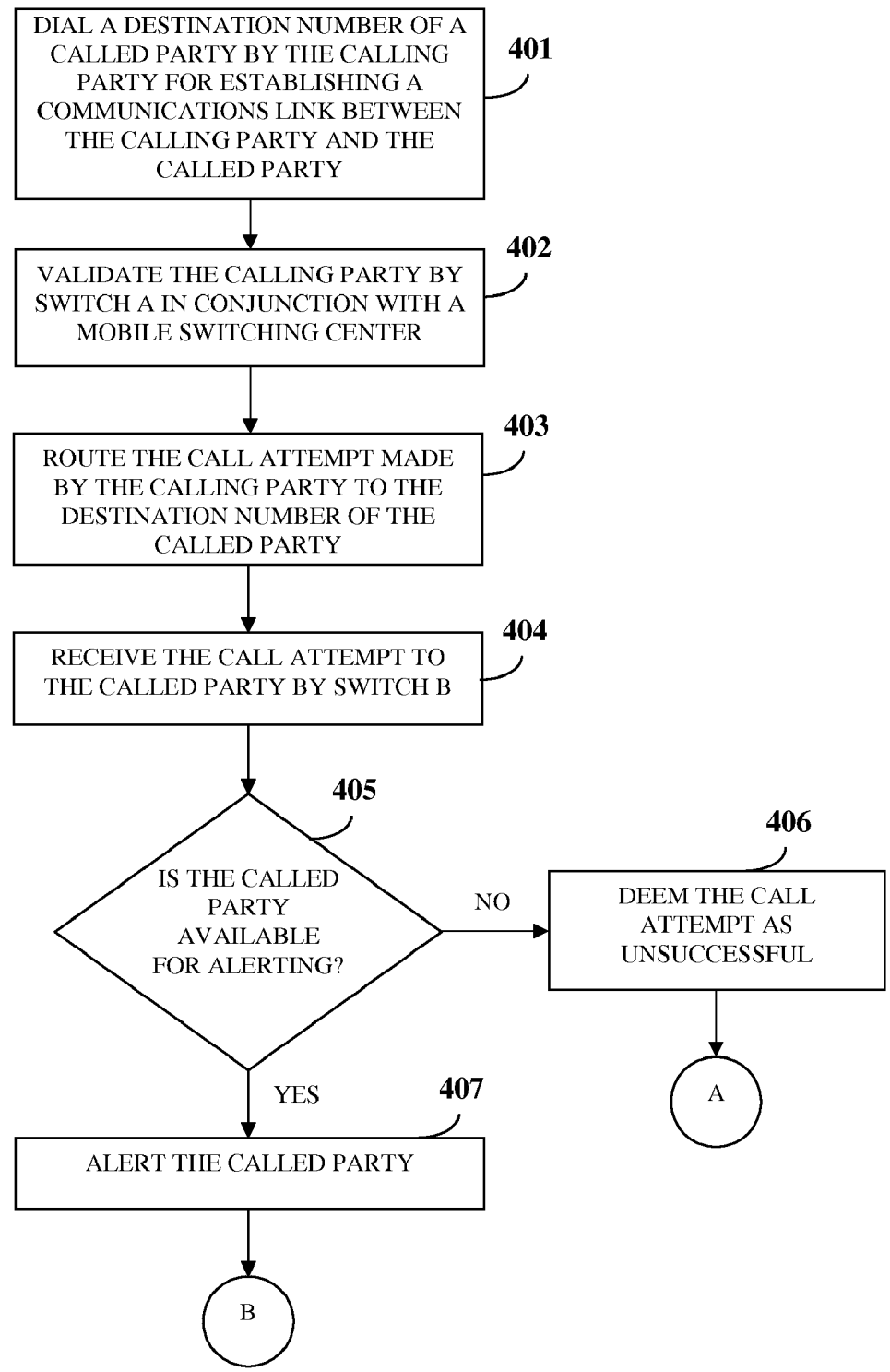
FIGS. 4A-4C exemplarily illustrate a flowchart comprising the steps for managing billing of a calling party for an unanswered call attempt made to a called party.
Figure 4B:
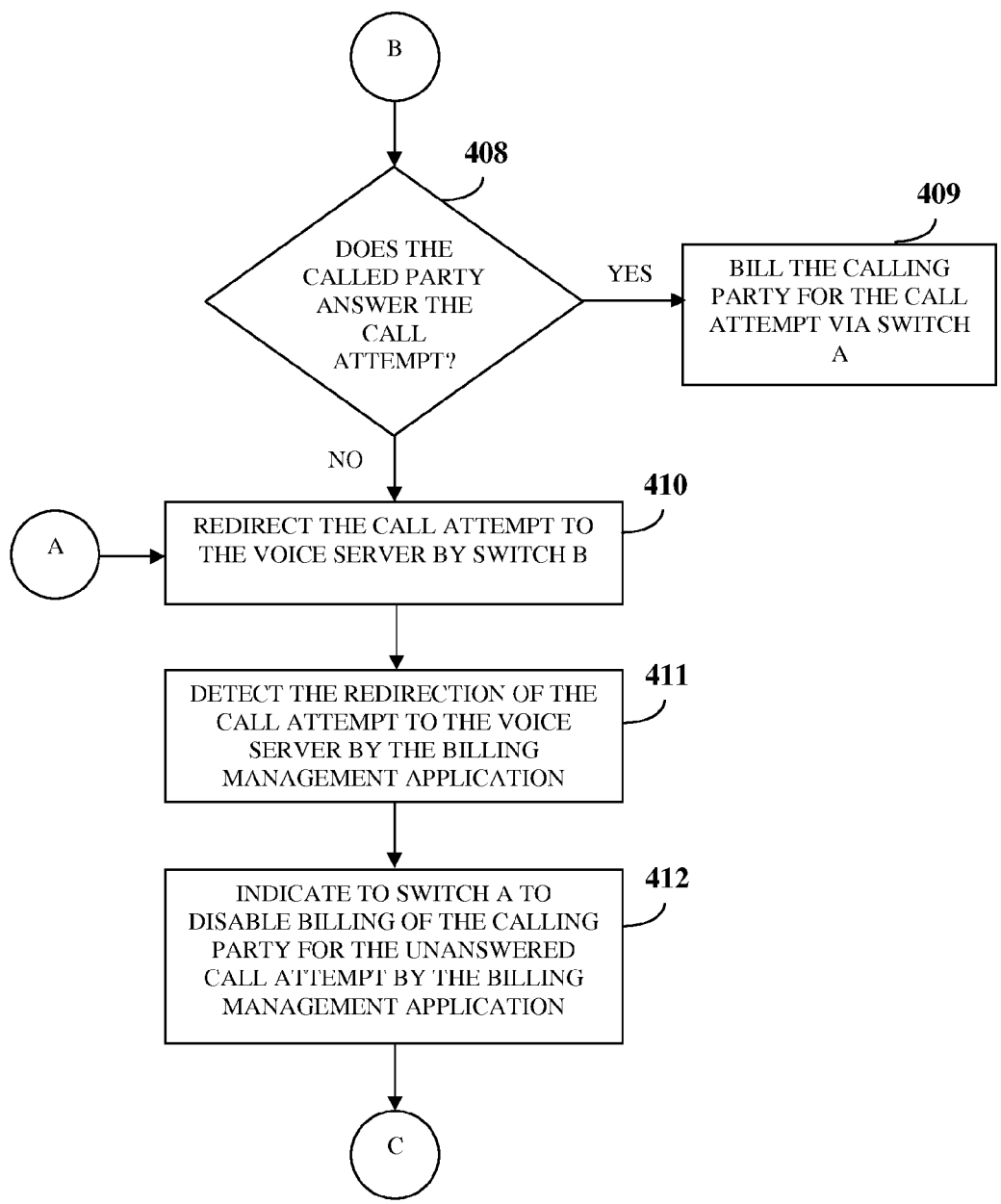
Figure 4C:
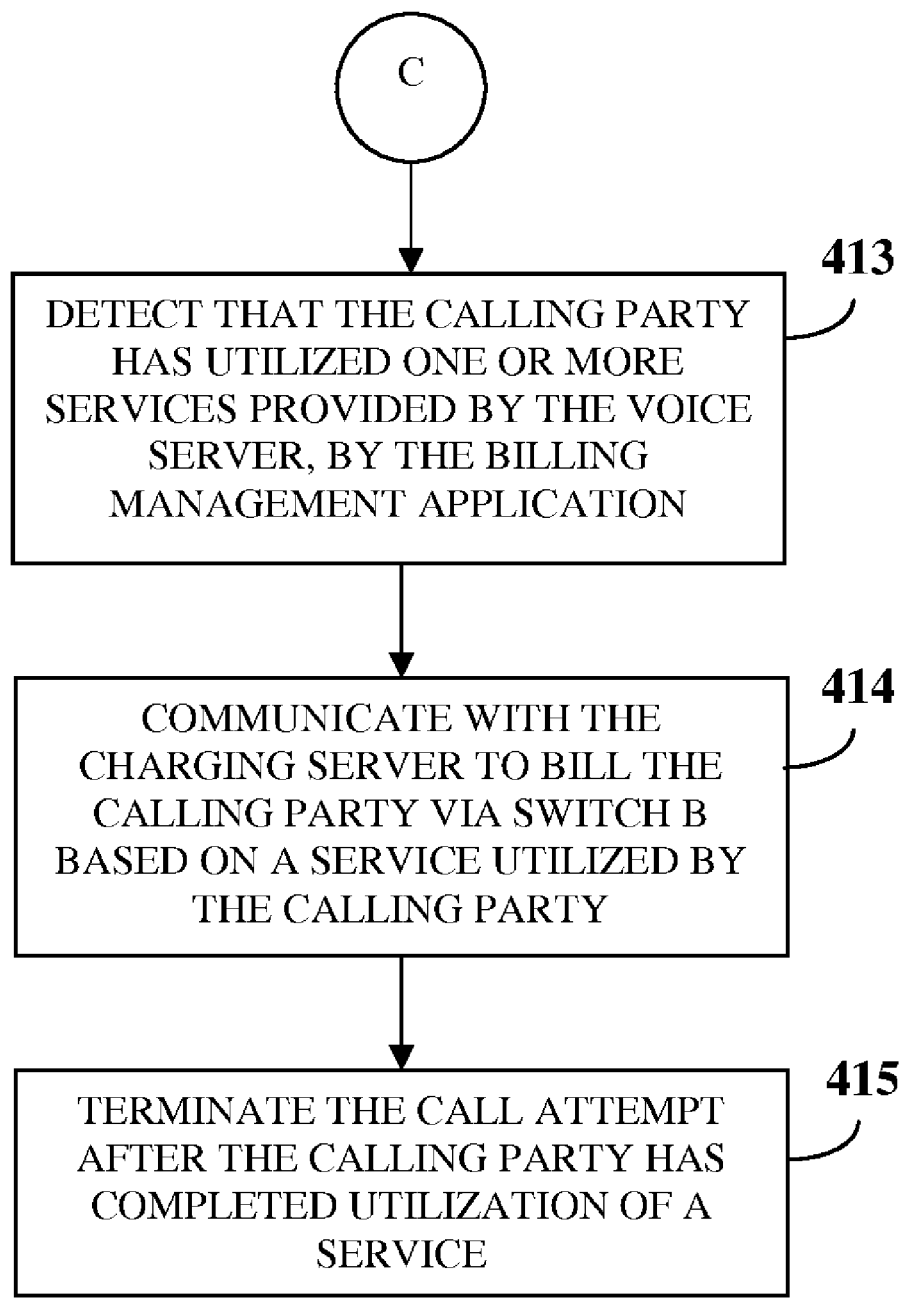

FIGS. 4A-4C exemplarily illustrate a flowchart comprising the steps for managing billing of a calling party 201 for an unanswered call attempt made to a called party 204. Consider an example where a calling party A 201 dials 401a destination number of a called party B 204 using a communication device 210 of the calling party A 201 for establishing a communications link between the calling party A 201 and the called party B 204 in a global system for mobile (GSM) communications network 209. The first network component 202 is herein referred to as "switch A" referenced by the numeral 202. Switch A 202 is, for example, a base station controller (BSC). Switch A 202 in conjunction with a mobile switching center (MSC) of the GSM network 209 validates 402 the calling party A 201 and allows the calling party A 201 to initiate a call attempt to the called party B 204. Switch A 202 validates the calling party A 201 by determining whether the calling party A 201 is a valid customer. After validation, the GSM network 209 allows the calling party A 201 to proceed with the call attempt. Switch A 202 then routes 403 the call attempt made by the calling party A 201 to the destination number of the called party B 204 via the second network component 203 herein referred to as "switch B" referenced by the numeral 203. Switch A 202 treats the call attempt as a regular call attempt where the calling party A 201 is billed based on the subscription plan of the calling party A 201, when the called party B 204 answers the call. Switch A 202 may not bill the calling party A 201 if the destination number of the called party B 204 is a toll free number.

The called party B 204 may be a fixed line customer or a mobile customer. If the called party B 204 is a mobile customer in the GSM network 209, switch B 203 is the base station controller (BSC) where the called party B 204 is currently connected as per a home location register (HLR) status and/or a visitor location register (VLR) status of the called party B 204. When switch B 203 receives 404 the call attempt at an integrated services digital network user part (ISUP) level, switch B 203 checks 405 whether the called party B 204 is available for alerting. If the called party B 204 is not available for alerting, the call attempt is deemed 406 as an unsuccessful call attempt. Switch B 203 redirects 410 the unsuccessful call attempt to the voice server 205 associated with switch B 203. If the called party B 204 is available for alerting, the called party B 204 is alerted 407, for example, by ringing.

If the called party B 204 answers 408 the call attempt, the communications link is established between the calling party A 201 and the called party B 204. As per billing rules in conventional GSM networks 209, switch A 202 bills the calling party A 201 for regular voice calls and switch B 203 bills the called party B 204, if the call is a toll free call. In this example, the call is a regular voice call and switch A 202 bills 409 the calling party A 201 based on the subscription plan of the calling party A 201.

If the call attempt is unanswered 408 by the called party B 204, switch B 203 redirects 410 the call attempt to the voice server 205 associated with switch B 203. The voice server 205 provides voice services, for example, automatic voice short message services (AVSMS), voicemail, etc. The billing management application 207 detects 411 the redirection of the call attempt to the voice server 205.

The billing management application 207 then indicates 412 to switch A 202 to disable billing of the calling party A 201 for the unanswered call attempt. The billing management application 207 indicates to switch A 202 to disable billing the calling party A 201 in one of the following methods: In a first method, the billing management application 207 sends one or more message parameters during ISUP signaling, in which an ISUP answer message comprises a billing indicator, for example, "no charge". In a second method, the billing management application 207 withholds transmission of the ISUP answer message comprising the billing indicator. Since the ISUP answer message is not received by switch A 202, switch A 202 does not initiate billing of the calling party A 201 by the charging server 208 associated with the calling party A 201. In a third method, the billing management application 207 directly communicates with switch A 202 to not initiate billing the calling party A 201 via a proprietary communications protocol. In a fourth method, the billing management application 207 instructs the charging server 208 to disregard the billing requests by switch A 202 for billing the calling party A 201. The billing management application 207 indicates to the first network component 202 to disable billing of the calling party A 201, for example, prior to initiation of call processing by the voice server 205.

The billing management application 207 communicates with the charging server 208 to bill the calling party A 201 based on services provided by the voice server 205 to the calling party A 201. The voice server 205 offers a voice based menu and allows the calling party A 201 to make choices as per services to be utilized by the calling party A 201. The voice server 205 also has capability to record the voice messages as spoken by the calling party A 201. Since this voice recording is independent of language, the voice recording can be performed in any language and is therefore language agnostic.

The billing management application 207 detects 413 that the calling party A 201 has utilized one or more services provided by the voice server 205, for example, that the calling party A 201 has left a voice recording for the called party B 204. The billing management application 207 then communicates 414 with the charging server 208 to bill the calling party A 201 via switch B 203 based on the service utilized by the calling party A 201, that is, for the voice recording left for the called party B 204 by the calling party A 201. After the calling party A 201 has completed utilization of the service by completing the voice recording, the call attempt is terminated 415 by the calling party A 201, the billing management application 207, or switch A 202.

It will be readily apparent that the various methods and algorithms disclosed herein may be implemented on computer readable media appropriately programmed for general purpose computers and computing devices. As used herein, the term "computer readable media" refers to non-transitory computer readable media that participate in providing data, for example, instructions that may be read by a computer, a processor or a like device. Non-transitory computer readable media comprise all computer readable media, for example, non-volatile media, volatile media, and transmission media, except for a transitory, propagating signal. Non-volatile media comprise, for example, optical disks or magnetic disks and other persistent memory volatile media including a dynamic random access memory (DRAM), which typically constitutes the main memory. Volatile media comprise, for example, a register memory, processor cache, a random access memory (RAM), etc. Transmission media comprise, for example, coaxial cables, copper wire and fiber optics, including wires that constitute a system bus coupled to a processor. Common forms of computer readable media comprise, for example, a floppy disk, a flexible disk, hard disk, magnetic tape, any other magnetic medium, a compact disc-read only memory (CD-ROM), digital versatile disc (DVD), any other optical medium, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, or any other medium from which a computer can read. A "processor" refers to any one or more microprocessors, central processing unit (CPU) devices, computing devices, micro-controllers, digital signal processors, or like devices. Typically, a processor receives instructions from a memory or like device, and executes those instructions, thereby performing one or more processes defined by those instructions. Further, programs that implement such methods and algorithms may be stored and transmitted using a variety of media, for example, the computer readable media in a number of manners. In an embodiment, hard-wired circuitry or custom hardware may be used in place of, or in combination with, software instructions for implementation of the processes of various embodiments. Thus, embodiments are not limited to any specific combination of hardware and software. In general, the computer program codes comprising computer executable instructions may be implemented in any programming language. Some examples of languages that can be used comprise C, C++, C#, Perl, Python, JAVA, PHP, JavaScript, Flex, Ruby, JavaServer Pages (JSP), Active Server Pages (ASP), etc. The computer program codes or software programs may be stored on or in one or more mediums as object codes. The computer program product disclosed herein comprises computer executable instructions embodied in a non-transitory computer readable storage medium, wherein the computer program product comprises computer program codes for implementing the processes of various embodiments.

The present invention can be configured to work in a network environment including a computer that is in communication, via a communications network, with one or more devices. The computer may communicate with the devices directly or indirectly, via a wired or wireless medium such as the Internet, a local area network (LAN), a wide area network (WAN) or the Ethernet, token ring, or via any appropriate communications means or combination of communications means. Each of the devices may comprise computers such as those based on the Intel® processors, AMD® processors, UltraSPARC® processors, Sun® processors, IBM® processors, etc., that are adapted to communicate with the computer. Any number and type of machines may be in communication with the computer.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

We claim:

1. A method for billing a calling party for an unanswered call attempt made to a called party, comprising:
   providing a billing management application in communication with a voice server for managing said billing of said calling party;
   receiving a call attempt by a first network component from said calling party to contact said called party;
   routing said received call attempt by said first network component to a second network component for establishing a communications link between said calling party and said called party;
   redirecting said call attempt unanswered by said called party to said voice server by said second network component;
   detecting said redirection of said call attempt unanswered by said called party to said voice server by said billing management application;
   indicating to said first network component to disable said billing of said calling party for said unanswered call attempt, by said billing management application; and
   initiating said billing of said calling party based on billing criteria by said billing management application in communication with said voice server, via said second network component for utilizing one or more services provided by said voice server;
   whereby said calling party is billed via said second network component instead of said first network component for said utilization of said one or more services provided by said voice server.

2. The method of claim 1, wherein said indicating to said first network component to disable said billing of said calling party is performed by transmitting one or more message parameters to said first network component by said billing management application prior to, during, and/or after receipt of a call answer message from said voice server.

3. The method of claim 1, wherein said indicating to said first network component to disable said billing of said calling party is performed by direct communication between said billing management application and said first network component via a proprietary communications protocol.

4. The method of claim 1, wherein said indicating to said first network component to disable said billing of said calling party is performed by informing a charging server associated with said calling party to disregard billing requests made by said first network component for said billing of said calling party.

5. The method of claim 1, wherein said indicating to said first network component to disable said billing of said calling party is performed by an absence of a billing communication between said billing management application and said first network component, wherein said first network component disables said billing of said calling party due to said absence of said billing communication.

6. The method of claim 1, further comprising detecting said utilization of said one or more services by said calling party by said billing management application and informing a charging server associated with said calling party to bill said calling party as directed by said billing management application.

7. The method of claim 1, further comprising terminating said utilization of said one or more services provided by said voice server, by one of said billing management application, said calling party, and said first network component.

8. The method of claim 1, further comprising detecting redirection of repeated call attempts made by said calling party to contact said called party within a short period of time to said voice server as emergency call attempts by said billing management application, wherein said billing management application in communication with said voice server initiates said billing of said calling party via said second network component for utilizing one or more emergency services provided by said voice server for said emergency call attempts unanswered by said called party.

9. The method of claim 1, further comprising providing said one or more services to said calling party by said voice server based on one or more of said billing criteria, wherein said billing management application in communication with said voice server initiates said billing of said calling party based on said one or more of said billing criteria via said second network component for utilizing said provided one or more services.

10. The method of claim 1, wherein said billing criteria comprise one or more of event based criteria, time duration based criteria, a charging limit defined by a charging server associated with said calling party, state of said call attempt, number of said services utilized by said calling party, type of said services utilized by said calling party, and any combination thereof.

11. The method of claim 1, further comprising determining billing charge for said calling party by said billing management application based on one or more of said billing criteria.

12. The method of claim 1, wherein said call attempt is redirected to said voice server by said second network component due to an occurrence of one of a busy signal, an out of coverage signal, an unreachable signal, a switched off signal, network congestion, and an unanswered signal from said called party.

13. The method of claim 1, wherein said one or more services provided by said voice server comprise one or more of automatic voice short message services, voicemail services, emergency services, and non-voice services.

14. A system for billing a calling party for an unanswered call attempt made to a called party, comprising:
   a first network component that receives a call attempt from said calling party to contact said called party and routes said received call attempt to a second network component for establishing a communications link between said calling party and said called party;
   a second network component that redirects said call attempt unanswered by said called party to a voice server;
   a billing management application in communication with said voice server for managing said billing of said calling party, wherein said billing management application comprises:
      a detection module that detects said redirection of said call attempt unanswered by said called party to said voice server;
      an indication module that indicates to said first network component to disable said billing of said calling party for said unanswered call attempt; and
      a billing initiation module, in communication with said voice server, that initiates said billing of said calling party based on billing criteria via said second network component for utilizing one or more services provided by said voice server;
   whereby said calling party is billed via said second network component instead of said first network component for said utilization of said one or more services provided by said voice server.

15. The system of claim 14, wherein said indication module communicates with and indicates to said first network component to disable said billing of said calling party by transmitting one or more message parameters to said first network component prior to, during, and/or after receipt of a call answer message from said voice server.

16. The system of claim 14, wherein said indication module communicates with and indicates to said first network component to disable said billing of said calling party by direct communication between said billing management application and said first network component via a proprietary communications protocol.

17. The system of claim 14, wherein said indication module communicates with and indicates to said first network component to disable said billing of said calling party by informing a charging server associated with said calling party to disregard billing requests made by said first network component for said billing of said calling party.

18. The system of claim 14, wherein said indication module indicates to said first network component to disable said billing of said calling party by an absence of a billing communication between said billing management application and said first network component, wherein said first network component disables said billing of said calling party due to said absence of said billing communication.

19. The system of claim 14, wherein said detection module detects utilization of said one or more services by said calling party and informs a charging server associated with said calling party to bill said calling party as directed by said billing initiation module.

20. The system of claim 14, wherein said billing initiation module terminates said utilization of said one or more services provided by said voice server.

21. The system of claim 14, wherein said detection module detects redirection of repeated call attempts made by said calling party to contact said called party within a short period of time to said voice server as emergency call attempts, wherein said billing initiation module of said billing management application in communication with said voice server initiates said billing of said calling party via said second network component for utilizing one or more emergency services provided by said voice server for said emergency call attempts unanswered by said called party.

22. The system of claim 14, wherein said voice server provides said one or more services to said calling party based on one or more of said billing criteria, wherein said billing initiation module of said billing management application in communication with said voice server initiates said billing of said calling party based on said one or more of said billing criteria via said second network component for utilizing said provided one or more services.

23. The system of claim 14, wherein said billing criteria comprise one or more of event based criteria, time duration based criteria, a charging limit defined by a charging server associated with said calling party, state of said call attempt, number of said services utilized by said calling party, type of said services utilized by said calling party, and any combination thereof.

24. The system of claim 14, wherein said billing initiation module determines billing charge for said calling party based on one or more of said billing criteria.

25. The system of claim 14, wherein said second network component redirects said call attempt to said voice server due to an occurrence of one of a busy signal, an out of coverage signal, an unreachable signal, a switched off signal, network congestion, and an unanswered signal from said called party.

26. The system of claim 14, wherein said billing management application is one of implemented within said voice server and implemented on an independent server.

27. A computer program product comprising computer executable instructions embodied in a non-transitory computer readable storage medium, wherein said computer program product comprises:
   a first computer program code for detecting redirection of a call attempt made by a calling party and unanswered by a called party to a voice server, wherein said voice server receives said redirected call attempt from a second network component that received said call attempt from a first network component associated with said calling party;
   a second computer program code for indicating to said first network component to disable billing of said calling party for said unanswered call attempt; and
   a third computer program code for initiating said billing of said calling party based on billing criteria, in communication with said voice server, via said second network component, for utilizing one or more services provided by said voice server, whereby said calling party is billed via said second network component instead of said first network component, for said utilization of said one or more services provided by said voice server.

* * * * *